United States Patent
Lee et al.

(10) Patent No.: US 8,107,230 B2
(45) Date of Patent: Jan. 31, 2012

(54) DISPLAY DEVICE AND CASE FOR THE SAME

(75) Inventors: Jeoung-gwen Lee, Suwon-si (KR); Chun-hyun Cho, Gyeonggi-do (KR); Sang-min Kang, Cheonan-si (KR); Jin-soo Shin, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/551,838

(22) Filed: Sep. 1, 2009

(65) Prior Publication Data

US 2009/0316345 A1 Dec. 24, 2009

Related U.S. Application Data

(63) Continuation of application No. 11/965,572, filed on Dec. 27, 2007, now abandoned.

(30) Foreign Application Priority Data

Jan. 19, 2007 (KR) .......................... 10-2007-0005933

(51) Int. Cl.
G06F 1/16 (2006.01)

(52) U.S. Cl. ................... 361/679.27; 349/150; 347/104; 345/204; 206/746

(58) Field of Classification Search ............... 349/60, 349/150, 115, 58, 96, 106, 67, 156; 361/679.06, 361/679.21, 679.27, 679.3, 679.01, 679.04, 361/679.22, 679.33, 679.54; 347/42, 102, 347/104; 345/76, 419, 87, 204, 1.1, 92, 1.3; 312/7.2, 196; 206/314, 320, 746, 304.1
See application file for complete search history.

(56) References Cited

U.S. PATENT DOCUMENTS

| | | | |
|---|---|---|---|
| 7,244,966 B2 * | 7/2007 | Fukayama | 257/98 |
| 7,659,949 B2 * | 2/2010 | Sawada et al. | 349/58 |
| 7,679,696 B2 * | 3/2010 | Makino | 349/58 |
| 2002/0067591 A1 * | 6/2002 | Tajima | 361/681 |
| 2007/0296903 A1 * | 12/2007 | Lee et al. | 349/143 |
| 2010/0194721 A1 * | 8/2010 | Miyata et al. | 345/206 |

FOREIGN PATENT DOCUMENTS

CN 1637500 7/2005

* cited by examiner

*Primary Examiner* — Hung V Duong
(74) *Attorney, Agent, or Firm* — F. Chau & Associates, LLC

(57) ABSTRACT

A display device includes a panel assembly on which an image is formed, a cover member which comprises a front portion having a display window exposing at least a portion of a front side of the panel assembly and a side portion which is bent from the front portion, the cover member having one or more joining regions where a pair of end portions engage with and are joined to each other, the cover member comprising a first joining part and a second joining part which are formed at the pair of end portions, respectively, wherein at least one of the first joining part and the second joining part include a region stepped from a surface of the cover member, and at least a portion of the first joining part and the second joining part overlap each other, and an accommodating member which accommodates the panel assembly and is joined to the cover member.

21 Claims, 21 Drawing Sheets

DISPLAY DEVICE AND CASE FOR THE SAME

CROSS-REFERENCE TO RELATED APPLICATION

This application is a Continuation Application of U.S. patent application Ser. No. 11/965,572 filed Dec. 27, 2007 now abandoned which claims priority from Korean Patent Application No. 10-2007-0005933, filed on Jan. 19, 2007, the disclosures of which are incorporated herein by reference in their entirety.

BACKGROUND OF INVENTION

1. Technical Field

The present invention relates to a display device, and more particularly, to a display device with improved productivity, and a case for the display device.

2. Discussion of the Related Art

Liquid crystal display (LCD) devices have become popular due to their smaller size, lightweight and improved performance when compared with conventional display devices.

The liquid crystal display devices are being employed in information processing devices including middle or large-sized products, such as monitors, TVs and the like as well as smaller-sized products such as mobile phones, personal digital assistants (PDAs), portable multimedia players (PMPs) and the like.

A display device may include a display panel, an accommodating member enclosing the display panel, and a cover member. The cover member may have a display window exposing the front side of the display panel.

The cover member has been fabricated through processes including punching a metal plate in a hollow rectangular shape and then cutting and bending the metal plate. Accordingly, the central portion cut out of the metal plate remains unused and is wasted material.

SUMMARY OF THE INVENTION

Embodiments of the present invention provide a display device with improved productivity, and a case for use in the display device.

A display device, in accordance with an embodiment of the present invention, comprises a panel assembly on which an image is formed, a cover member which comprises a front portion having a display window exposing at least a portion of a front side of the panel assembly and a side portion which is bent from the front portion, the cover member having one or more joining regions where a pair of end portions engage with and are joined to each other, the cover member comprising a first joining part and a second joining part which are formed at the pair of end portions, respectively, wherein at least one of the first joining part and the second joining part include a region stepped from a surface of the cover member, and at least a portion of the first joining part and the second joining part overlap each other, and an accommodating member which accommodates the panel assembly and is joined to the cover member.

According to an aspect of the invention, the first joining part comprises a first front joining part which is formed in the front portion of the cover member, and a first side joining part which is formed in the side portion of the cover member, and wherein the second joining part comprises a second front joining part which is formed in the front portion of the cover member, and a second side joining part which is formed in the side portion of the cover member.

According to an aspect of the invention, an end portion of the first joining part contacts an end portion of the second joining part in a stepped pattern.

According to an aspect of the invention, the end portion of the first joining part and the end portion of the second joining part include a convex portion and a concave portion, respectively, and a concave portion and a convex portion respectively, and wherein the convex portion of the first joining part contacts the concave portion of the second joining part, and the convex portion of the second joining part contacts the concave portion of the first joining part.

According to an aspect of the invention, the first joining part comprises a joining plate, and the second joining part comprises a joining mount overlapping with the joining plate, and wherein the first joining part and the second joining part are calking-joined to each other by punching an overlapping plane of the joining plate and the joining mount.

According to an aspect of the invention, the first joining part comprises a joining plate, and the second joining part comprises a joining mount overlapping with the joining plate, and wherein an overlapping plane of the joining plate and the joining mount is welded using one of a spot welding method and a laser welding method.

According to an aspect of the invention, the first joining part further comprises an extending portion which extends from the end portion of the cover member, and a locking portion which is formed at an end of the extending portion, and wherein the second joining part further comprises a locking groove which is formed corresponding to the extending portion and the locking portion.

According to an aspect of the invention, the locking portion of the first joining part is tightly joined to the locking groove of the second joining part.

According to an aspect of the invention, the first joining part further comprises a joining plate, and the second joining part further comprises a joining mount overlapping the joining plate, and wherein a locking hole is formed in one of the joining plate and the joining mount, and a locking projection, which penetrates the locking hole to be joined with the locking hole, is formed in the other of the joining plate or the joining mount.

According to an aspect of the invention, an end of the locking projection, which penetrates and projects from the locking hole, is deformed to closely join the joining plate to the joining mount.

According to an aspect of the invention, the joining plate comprises a first joining plate and a second joining plate, and the joining mount comprises a first joining mount and a second joining mount, which overlap the first joining plate and the second joining plate, respectively, and wherein the first joining plate contacts an outer surface of the first joining mount, and the second joining plate contacts an inner surface of the second joining mount.

According to an aspect of the invention, guide grooves, which guide the first joining plate and the second joining plate, respectively, are formed in the outer surface of the first joining mount and the inner surface of the second joining mount, respectively.

According to an aspect of the invention, the locking projection is formed in a hemisphere shape.

According to an aspect of the invention, the locking projection is formed in a polygonal shape.

According to an aspect of the invention, the accommodating member comprises a bottom portion and a side wall portion, the side wall portion is bent from the bottom portion and is joined to the side portion of the cover member.

According to an aspect of the invention, a portion of the side portion of the cover member contacts an inner surface of the side wall portion of the accommodating member, and another portion of the side portion of the cover member contacts an outer surface of the side wall portion of the accommodating member.

According to an aspect of the invention, the cover member includes a metal material.

According to an aspect of the invention, the display device further comprises a backlight assembly which is accommodated in the accommodating member and supplies light to the panel assembly.

A case for a display device, according to an embodiment of the present invention, comprises a cover member which comprises a front portion having a display window and a side portion which is bent from the front portion, the cover member having one or more joining regions where a pair of end portions engage with and are joined to each other, the cover member comprising a first joining part and a second joining part which are formed at the pair of end portions, respectively, wherein at least one of the first joining part and the second joining part include a region stepped from a surface of the cover member, and at least a portion of the first joining part and the second joining part overlapping with each other, and an accommodating member which is joined to the cover member.

According to an aspect of the invention, the first joining part comprises a first front joining part which is formed in the front portion of the cover member, and a first side joining part which is formed in the side portion of the cover member, and wherein the second joining part comprises a second front joining part which is formed in the front portion of the cover member, and a second side joining part which is formed in the side portion of the cover member.

According to an aspect of the invention, the first joining part further comprises a joining plate, and the second joining part further comprises a joining mount overlapping the joining plate, and wherein a locking hole is formed in one of the joining plate and the joining mount, and a locking projection, which penetrates the locking hole to be joined with the locking hole, is formed in the other of the joining plate and the joining mount.

According to an aspect of the invention, an end of the locking projection, which penetrates and projects from the locking hole, is deformed to closely join the joining plate to the joining mount.

According to an aspect of the invention, the joining plate comprises a first joining plate and a second joining plate, and the joining mount comprises a first joining mount and a second joining mount, which overlap the first joining plate and the second joining plate, respectively, and wherein the first joining plate contacts an outer surface of the first joining mount, and the second joining plate contacts an inner surface of the second joining mount.

According to an aspect of the invention, guide grooves, which guide the first joining plate and the second joining plate, respectively, are formed in the outer surface of the first joining mount and the inner surface of the second joining mount, respectively.

BRIEF DESCRIPTION OF THE DRAWINGS

Exemplary embodiments of the present invention can be understood in more detail from the following descriptions taken in conjunction with the accompanying drawings, in which.

DETAILED DESCRIPTION OF EXEMPLARY EMBODIMENTS OF THE INVENTION

Figure 1:
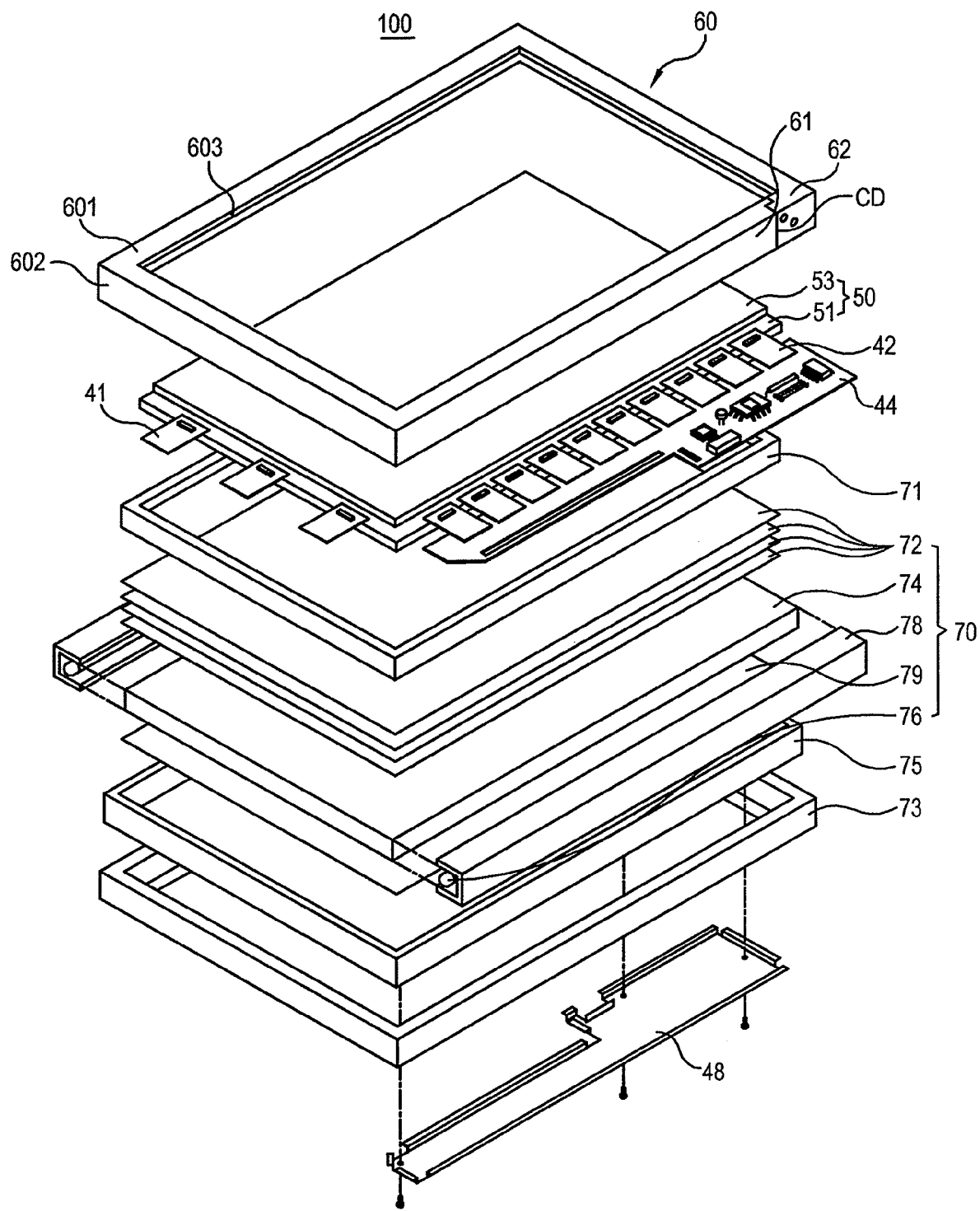
FIG. 1 is an exploded perspective view of a display device according to an exemplary embodiment of the present invention.

Exemplary embodiments of the present invention are described more fully hereinafter with reference to the accompanying drawings, in which exemplary embodiments of the invention are shown. This invention may, however, be embodied in many different forms and should not be construed as limited to the embodiments set forth herein.

Although the accompanying drawings show a liquid crystal display panel as an example of a panel assembly used for a display device, other types of display panels instead of the liquid crystal display panel may be used for the display device without departing from the spirit and scope of the present invention.

In addition, although the accompanying drawings show an edge-type backlight assembly as an example of a backlight assembly, other types of backlight assemblies instead of the edge-type backlight assembly may be used for the display device without departing from the spirit and scope of the present invention.

The backlight assembly may be omitted depending on the kind of panel assembly used for the display device.

In the following embodiments, the same components may be denoted by the same reference numerals, and explanation thereof may be representatively given in at least one exemplary embodiment and can be omitted in other exemplary embodiments.

As shown in FIG. 1, a display device 100 according to an exemplary embodiment of the present invention includes a panel assembly 50 which displays an image, a cover member 60 that has a display window 603 partially exposing a front side of the panel assembly 50 and surrounds edges of the front side and a lateral side of the panel assembly 50, and an accommodating member 75 that joins to the cover member and accommodates the panel assembly 50. In addition, the display device 100 further includes a backlight assembly 70 that is accommodated in the accommodating member 75 and supplies light to the panel assembly 50, and other necessary elements. The cover member 60 and the accommodating member 75 are joined to each other, thereby forming a case for the display device 100.

In addition, the display device 100 includes a plurality of driving integrated circuit chip packages 41 and 42 that are electrically connected to the panel assembly 50 and transmit a driving signal to the panel assembly 50, and a driving printed circuit board 44. The driving integrated circuit chip packages 41 and 42 may be provided as, for example, chip on film packages (COFs) or tape carrier packages (TCPs).

The driving integrated circuit chip packages 41 and 42 include a gate driving integrated circuit chip package 41 and a data driving integrated circuit chip package 42. The gate driving integrated circuit chip package 41 is attached to one side of the panel assembly 50 and supplies a gate signal to the panel assembly 50. The data driving integrated circuit chip package 42 is attached to another side of the panel assembly 50 and supplies a data signal to the panel assembly 50.

The panel assembly 50 includes a first panel 51 as a rear substrate, a second panel 53 as a front substrate, which is smaller than the first panel 51, and a liquid crystal layer (not shown) interposed between the first panel 51 and the second panel 53. First sides of the driving integrated circuit chip packages 41 and 42 are attached to edges of the first panel 51, which do not overlap with the second panel 53, to be connected to the panel assembly 50. In addition, second sides of one or more of the driving integrated circuit chip packages 41 and 42 are connected to the driving printed circuit 44.

Although FIG. 1 shows that only the data driving integrated circuit chip package 42 is connected to the driving printed circuit board 44, the present invention is not limited to this. The gate driving integrated circuit chip package 41 may be connected to a driving printed circuit board (not shown).

The driving printed circuit board 44 generates various kinds of control signals and transmits external digital signals to the data driving integrated circuit chip package 42. Integrated circuit chips of the data driving integrated circuit chip package 42 convert the digital signals into analog signals based on the various kinds of control signals from the driving printed circuit board 44, and supply the converted analog signals to the panel assembly 50 to drive the panel assembly 50.

Polarizing plates (not shown), which linearly polarize visible light rays supplied from the backlight assembly 70, are attached to the front side of the second panel 53 and the rear side of the first panel 51, respectively.

A plurality of thin film transistors (TFTs), color filters, pixel electrodes, a common electrode and so on are formed on the first panel 51 and the second panel 53. The liquid crystal layer is disposed between the pixel electrodes and the common electrode.

With this configuration, when the thin film transistors (functioning as switching elements) are turned on, an electric field is formed between the pixel electrodes and the common electrode. This electric field changes an orientation of liquid crystal molecules in the liquid crystal layer interposed between the first panel 51 and the second panel 53, thereby changing light transmittance to obtain a desired image.

The backlight assembly 70 includes a light source unit 76 that emits light, a light source cover 78, optical sheets 72, a light guide plate 74 and a reflecting member 79. Although not shown, the backlight assembly 70 further includes an inverter circuit substrate that is provided at the rear side of the accommodating member 75, and a wire that electrically interconnects the light source unit 76 and the inverter circuit substrate. The inverter circuit substrate transforms external power into a specified level of voltage and applies the transformed power to the light source unit 76 to drive the light source unit 76.

The light guide plate 74 includes one or more incidence planes and an emission plane crossing the incidence planes. The emission plane faces the panel assembly 50. FIG. 1 shows the light guide plate 74 having two incidence planes. The light guide plate 74 scatters light incident through the incidence planes substantially uniformly and emits the uniformly scattered light through the emission plane.

The light source unit 76 emits light to the incidence planes of the light guide plate 74. The light source unit 76 is disposed on opposite sides of and adjacent the light guide plate 74. An example of the light source unit 76 may include a cold cathode fluorescent lamp (CCFL), an external electrode fluorescent lamp (EEFL), a hot cathode fluorescent lamp (HCFL), a light emitting device such as a light emitting diode (LED), or others known in the art.

The reflecting member 79 is disposed adjacent to side of the light guide plate which is opposite to the emission plane of the light guide plate 74. The reflecting member 79 reflects light that is incident through the incidence plane and propagates the light to the emission plane through the side of the light guide plate opposite to the emission plane. The light reflected by the reflecting member 79 is emitted through the emission plane. Accordingly, the reflecting member 79 reduces light loss and assists in diffusing the light, thereby improving uniformity of the light emitted through the emission plane.

The light source cover 78 encloses the light source unit 76. The light source cover 78 has an inner surface that contains or is coated with a reflective material. That is, the light source cover 78 protects the light source unit 76 while reflecting light, which is emitted from the light source unit 76, toward the incidence plane of the light guide plate 74.

The optical sheets 72 further improve a luminance characteristic of the light emitted through the emission plane of the light guide plate 74. That is, light passing through the optical sheets 72 is scattered more uniformly and has increased luminance. The optical sheets 72 may include various functional sheets, for example, a diffusion sheet, a prism sheet, a brightness enhancement sheet, a protection sheet and so on.

The accommodating member 75 accommodates the light guide plate 74, the light source unit 76, the light source cover 78, the reflecting member 79, and the optical sheets 72. The display device 100 further includes a first supporting member 71 and a second supporting member 73. The first supporting member 71 is joined to the accommodating member 75 and supports the light guide plate 74, the light source unit 76, the light source cover 78, the reflecting member 79, and the optical sheets 72, which are accommodated in the accommodating member 75.

Although FIG. 1 shows that both of the accommodating member 75 and the first supporting member 71 are used, the present invention is not limited to this. For example, the first supporting member 71 may be omitted. If the first supporting member 71 is omitted, the accommodating member 75 may function as the first supporting member 71.

The second supporting member 73 is joined to the accommodating member 75 along lateral sides and edges of the rear side of the accommodating member 75. The second supporting member 73 reinforces the strength of the accommodating member 75 to prevent the accommodating member 75 from being bent or distorted. That is, the second supporting member 73 protects the accommodating member 75 against deformation. The second supporting member 73 may be omitted.

As the driving integrated circuit chip package 42 is bent, the driving printed circuit board 44 is disposed on the rear side of the accommodating member 75. The display device further includes a board cover 48 that is joined to the accommodating member 75 and covers the driving printed circuit board 44.

Although not shown, a control circuit board may be further provided at the rear side of the accommodating member 75. The control circuit board is electrically connected to the driving printed circuit board 44 and supplies the driving printed circuit board 44 with signals required for display of an image. The control circuit board is provided as an example and is not limited to that described herein. For example, the control circuit board may be omitted or may be formed in the driving printed circuit board 44.

The cover member 60 includes a front portion 601 having a display window 603 partially exposing the front side of the panel assembly 50, and a side portion 602 that is bent from the front portion 601 and faces lateral sides of the panel assembly 50. The cover member 60 has one or more joining regions CD in which a pair of end portions apart from each other are engaged with each other. The cover member 60 includes a first joining part 61 and a second joining part 62 which are formed at the pair of end portions, respectively. That is, the first joining part 61 engages with the second joining part 62 in the joining region CD. FIG. 1 shows that the cover member 60 has one joining region CD. Alternatively, the cover member 60 may have more than one joining region CD. The cover member 60 is made of a metal material. The cover member 60 is fabricated through processes including punching, cutting, and bending performed on a metal plate.

Figure 2:
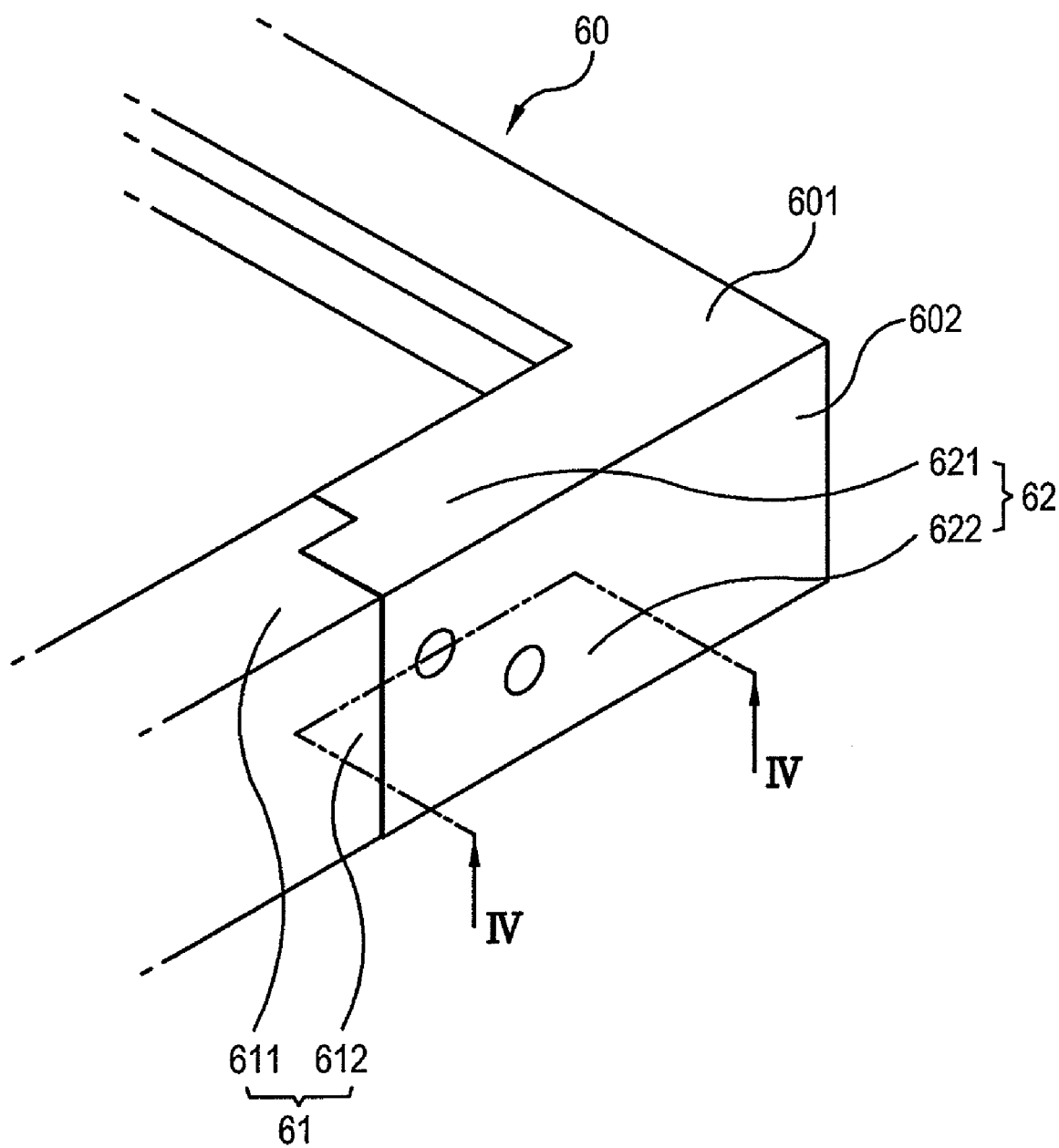
FIG. 2 is a partial perspective view showing a cover member of FIG. 1.

As shown in FIG. 2, the first joining part 61 includes a first front joining part 611 formed in the front portion 601 of the cover member 60, and a first side joining part 612 formed in the side portion 612 of the cover member 60. Similarly, the second joining part 62 includes a second front joining part 621 and a second side joining part 622.

Figure 3:
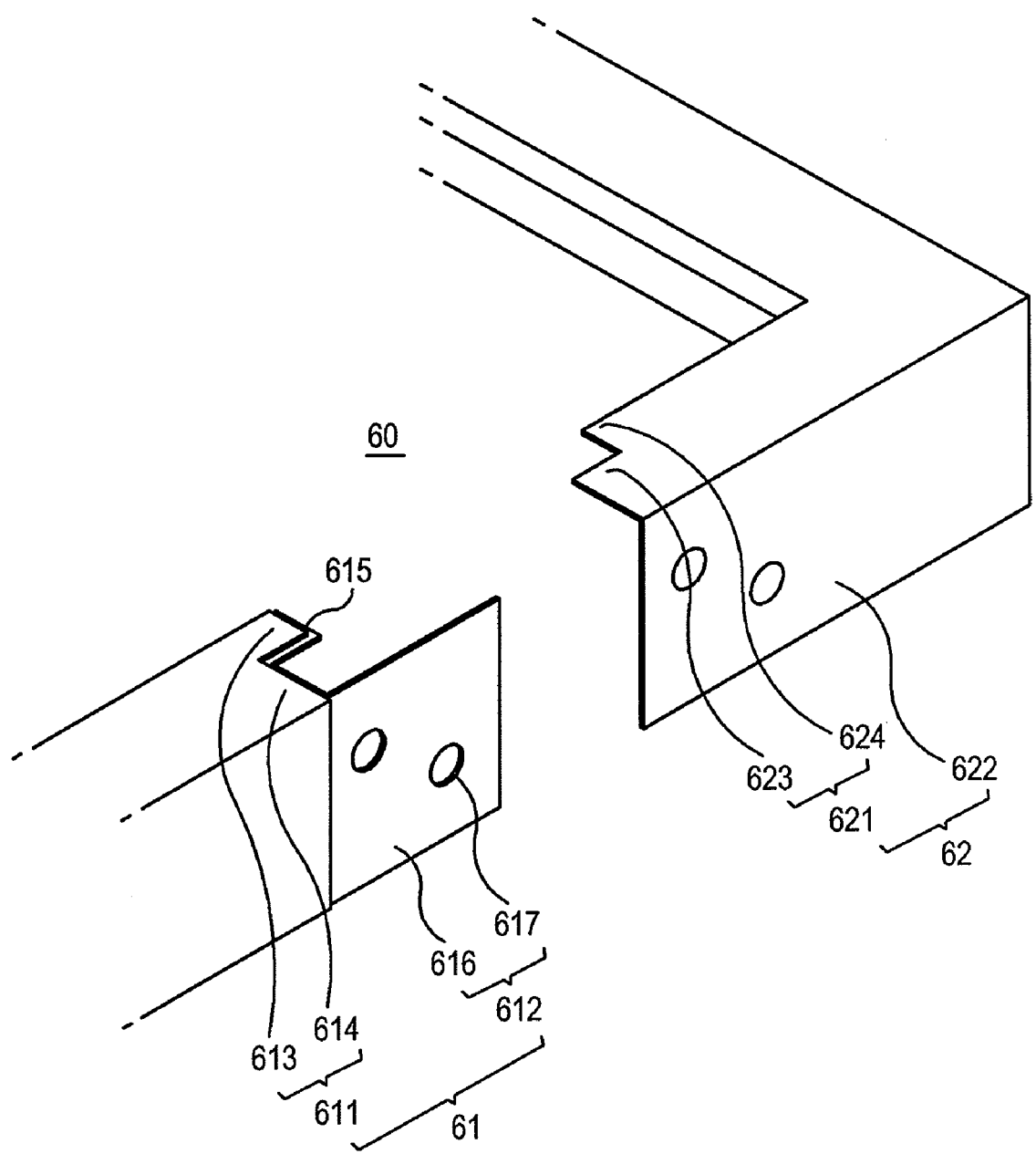
FIG. 3 is an exploded perspective view showing a joining region of the cover member of FIG. 2.

As shown in FIG. 3, an end portion of the first front joining part 611 and an end portion of the second front joining part 621 are formed to contact with each other in a stepped/zigzag pattern. The end portion of the first front joining part 611 and the end portion of the second front joining part 621 include convex portions 613 and 623 and concave portions 614 and 624, respectively. The convex portions 613 and 623 and the concave portions 614 and 624 are respectively protruded and depressed in a direction parallel to a plane of the first front joining part 611 and the second front joining part 621. The convex portion 613 of the first front joining part 611 contacts the concave portion 624 of the second front joining part 621, and the convex portion 614 of the first front joining part 611 contacts the concave portion 623 of the second front joining part 621.

In addition, at least one of the first joining part 61 and the second joining part 62 includes an additional stepped region stepped from a surface of the cover member 60, so that portions of the first joining part 61 and the second joining part 62 overlap with each other.

Specifically, referring to FIG. 3, one or both of the end portion of the first front joining part 611 and the end portion of the second front joining part 621 has a step 615 formed in a direction crossing the plane of the first front joining part 611 and the second front joining part 621. With this configuration, the end portion of the first front joining part 611 overlaps with the end portion of the second front joining part 621.

Accordingly, the first front joining part 611 overlaps and engages with the second front joining part 621 in both directions crossing and in parallel to the plane of the first front joining part 611 and the second front joining part 621.

Figure 4:
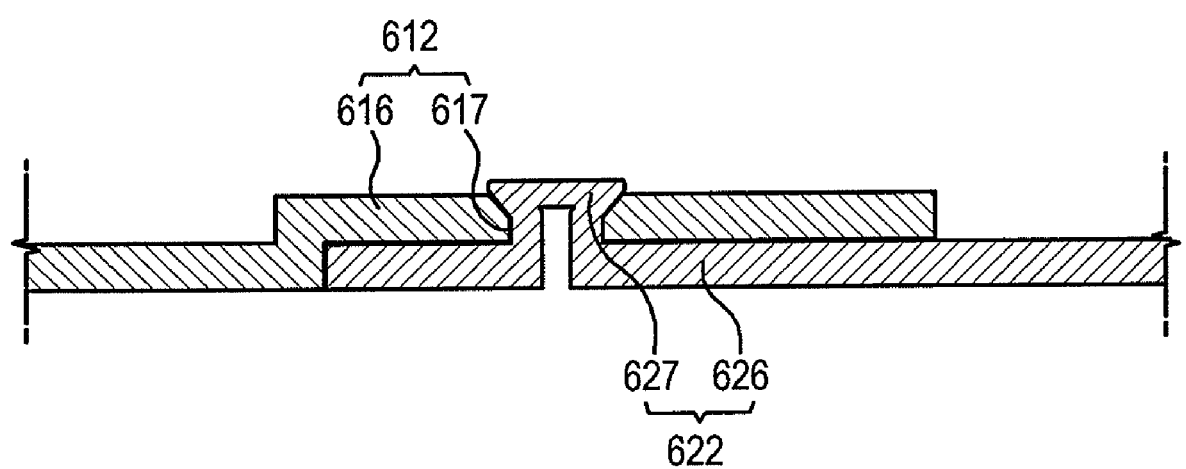
FIG. 4 is a sectional view taken along line IV-IV of FIG. 2.

As shown in FIGS. 3 and 4, the first side joining part 612 includes a joining plate 616 and one or more locking holes 617 formed in the joining plate 616. The second side joining part 622 includes a joining mount 626 overlapping the joining plate 616, and a locking projection 627 that projects from the joining mount 626 in a direction crossing a plane of the joining mount 626 and penetrates the locking hole 617. An end portion of the locking projection 627 that penetrates the locking hole 617 is deformed to prevent the locking projection 627 from becoming dislodged from the locking hole 617. Thus, the joining plate 616 is securely joined to the joining mount 626.

Positions at which the locking hole 617 and the locking projection 627 are formed are not limited. For example, the locking projection 627 may be formed in the joining plate 616, and the locking hole 617 may be formed in the joining mount 626.

Hereinafter, a process of joining the first side joining part 612 and the second side joining part 622 to each other will be described.

Figure 5:
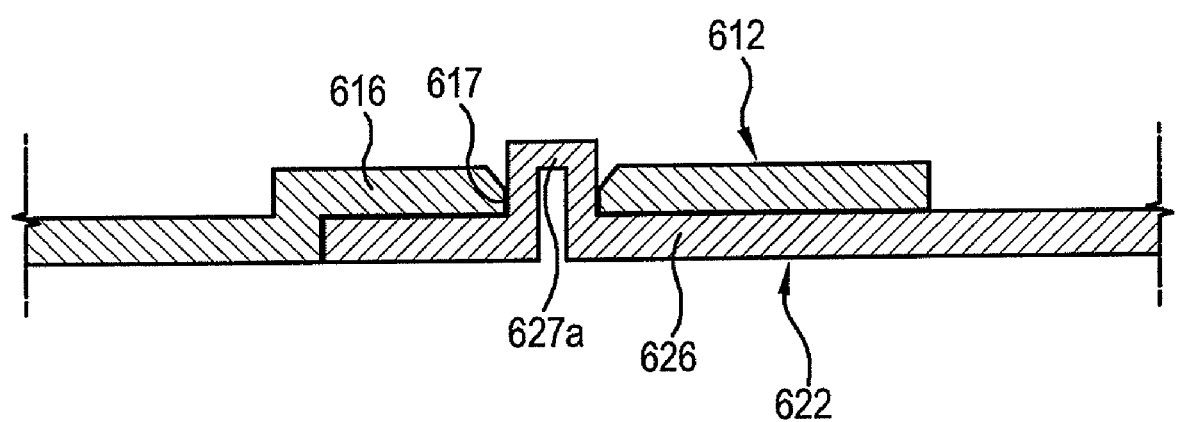
FIG. 5 is a sectional view showing a process of joining the cover member of FIG. 4.

First, as shown in FIG. 5, the locking projection 627 of the second side joining part 622 is inserted into the locking hole 617 of the first side joining part 612. Next, the end portion 627a of the locking projection 627 of the second side joining part 622 that projects through the locking hole 617 is deformed by thermal treating or beating in order to prevent the locking projection 627 from being dislodged from the locking hole 617. Accordingly, the first side joining part 612 is tightly joined to the second side joining part 622.

With this structure, the first joining part 61 is simply and stably joined to the second joining part 62. In addition, the tight joint between the first joining part 61 and the second joining part 62 can be maintained even under pressure in various directions.

The method of joining the first joining part 61 and the second joining part 62 to each other is provided as an example and is not particularly limited. For example, the method of joining the first side joining part 612 and the second side joining part 622 to each other may be substituted with the method of joining the first front joining part 611 and the second front joining part 621 together.

A method of fabricating the cover member 60 having a joining region CD (shown in FIG. 1) will be described with reference to FIGS. 6 and 7.

Figure 6:
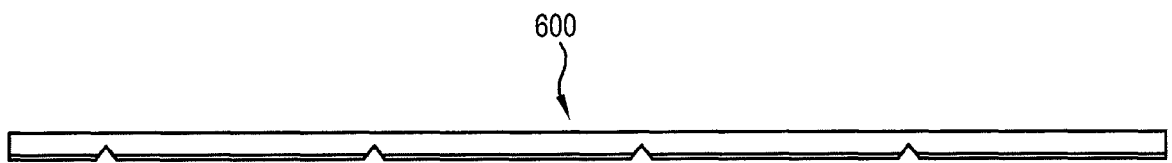
FIGS. 6 and 7 are plan views showing a process of fabricating the cover member of FIG. 1.

As shown in FIG. 6, a metal plate is cut to form a bar-like member 600. Next, the bar-like member 600 is bent to form the front portion 601 (shown in FIG. 1) and the side portion 602 (shown in FIG. 1).

Figure 7:
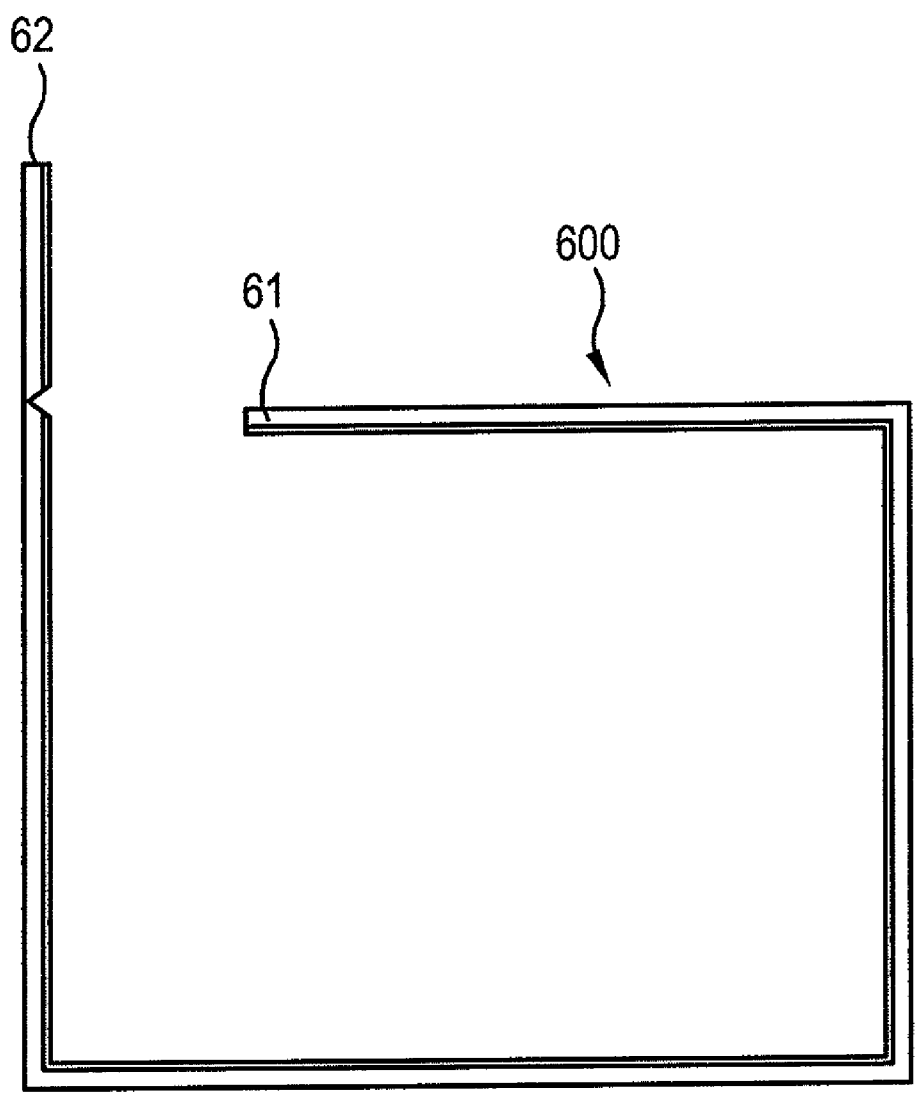

Next, as shown in FIG. 7, the bar-like member 600 is bent at preset intervals to have a substantially rectangular shape. End portions of the bar-like member 600 ultimately contact with each other. The first joining part 61 and the second joining part 62 are formed at both end portions, respectively.

Through the above-described process of fabricating the cover member 60, waste of the metal plate can be minimized. That is, an unused central portion need not be cut out of the metal plate.

As a result, the productivity for the case for use in the display device 100 is improved.

An exemplary embodiment of the present invention will be described with reference to FIG. 8.

Figure 8:
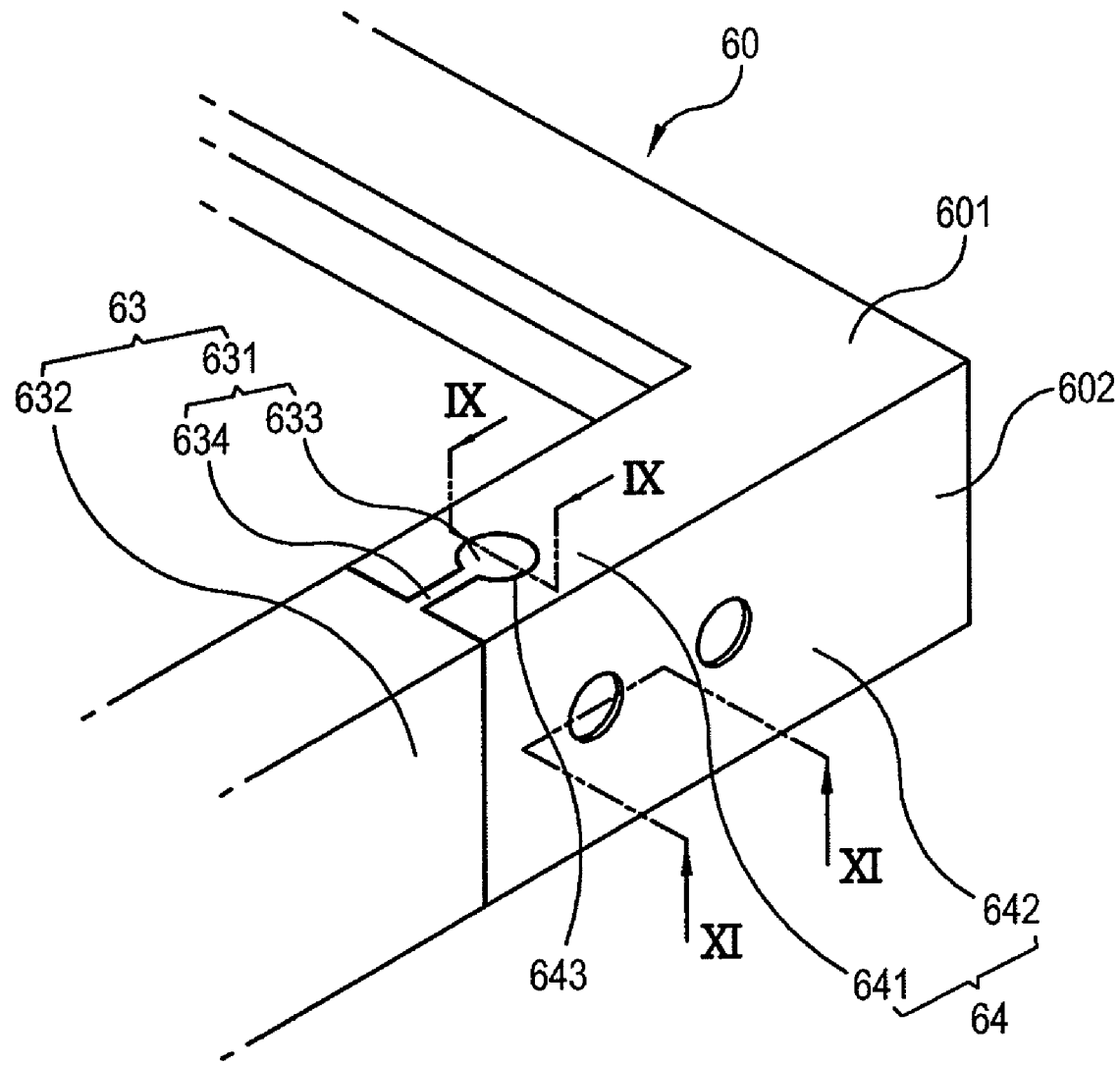
FIG. 8 is a partial perspective view of a cover member used for a display device according to an exemplary embodiment of the present invention.

As shown in FIG. 8, the cover member 60 includes a first joining part 63 and a second joining part 64. The first joining part 63 includes a first front joining part 631 formed in the front portion 601 of the cover member 60, and a first side joining part 632 formed in the side portion 602 of the cover member 60. Similarly, the second joining part 64 includes a second front joining part 641 and a second side joining part 642.

The first front joining part 631 includes an extending portion 634 extending from an end portion of the cover member 60, and a locking portion 633 formed at an end portion of the extending portion 634. The second front joining part 641 includes a locking groove 643 formed corresponding to the extending portion 634 and the locking portion 633 of the first front joining part 631. That is, the extending portion 634 and the locking portion 633 are received and secured in the locking groove 643.

Figure 9:
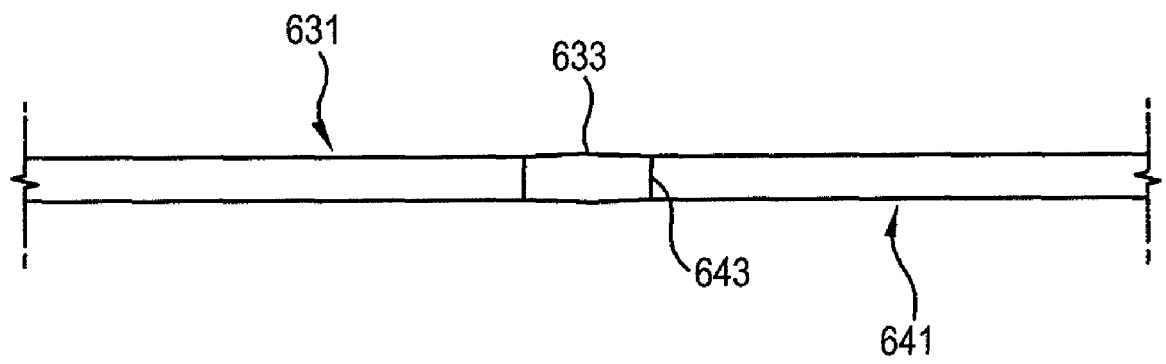
FIG. 9 is a sectional view taken along line IX-IX of FIG. 8.

As shown in FIG. 9, a thickness of the locking portion 633 is equal to or larger than the thickness of the second front joining part 641. The locking portion 633 is tightly inserted into the locking groove 643 without a gap between the locking portion 633 and the locking groove 643.

Figure 10:
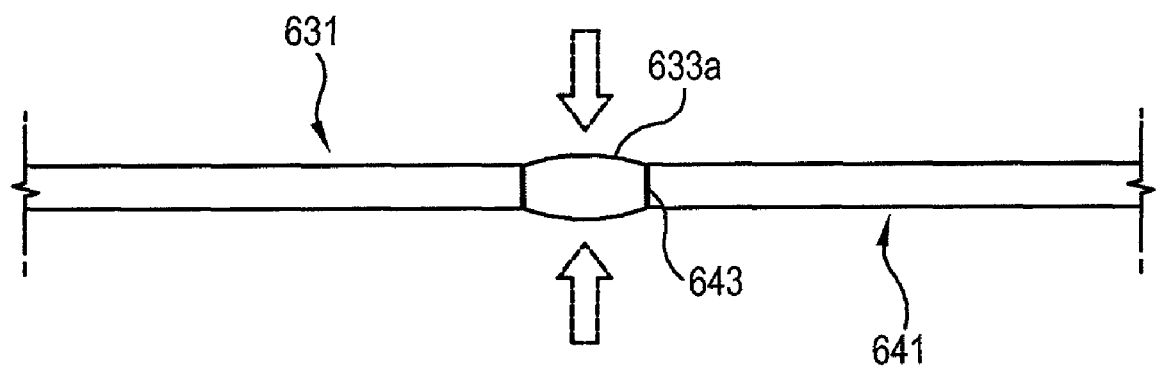
FIG. 10 is a sectional view showing a process of joining the cover member of FIG. 10.

A processing of joining the first front joining part 631 and the second front joining part 641 to each other will be further described. As shown in FIG. 10, a parent locking portion 633a is inserted into the locking groove 643. There is a fine gap between the parent locking portion 633a and the locking groove 643. Next, the parent locking portion 633a is beaten or thermally treated to be deformed into the locking portion 633 (shown in FIG. 9). The locking portion 633 is tightly joined to the locking groove 643 without a gap therebetween. Accordingly, the first front joining part 631 and the second front joining part 641 are simply and stably joined to each other.

Figure 11:
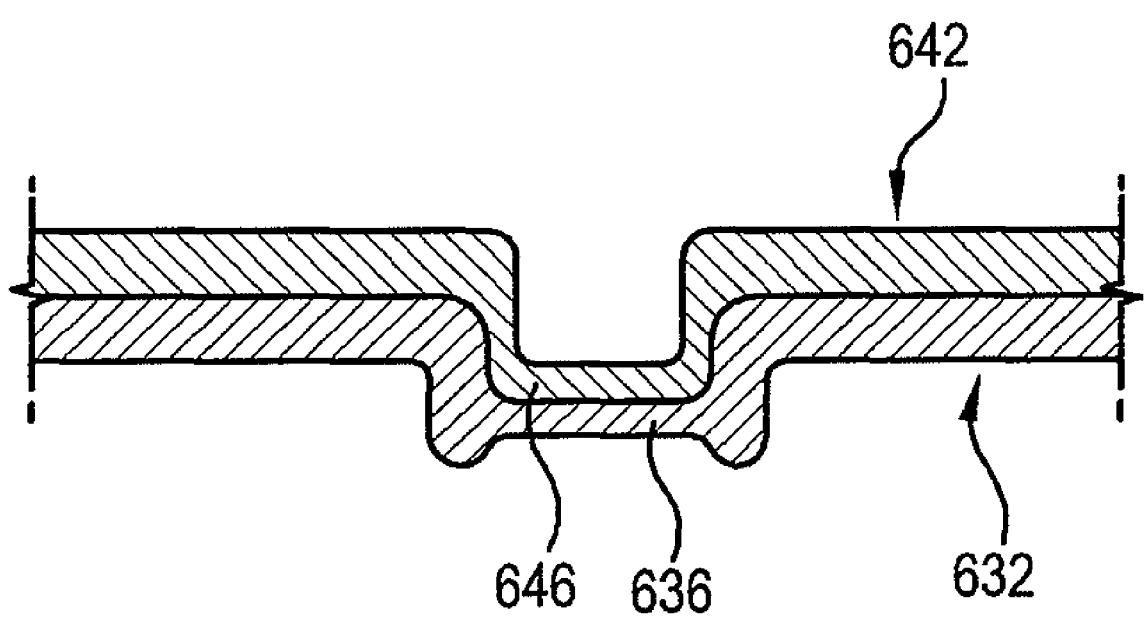
FIG. 11 is a sectional view taken along line XI-XI of FIG. 8.

As shown in FIG. 11, the first side joining part 632 includes a joining plate 636 and the second side joining part 642 includes a joining mount 646 overlapping the joining plate 636. The joining plate 636 and the joining mount 646 are joined to each other by calking.

Figure 12:
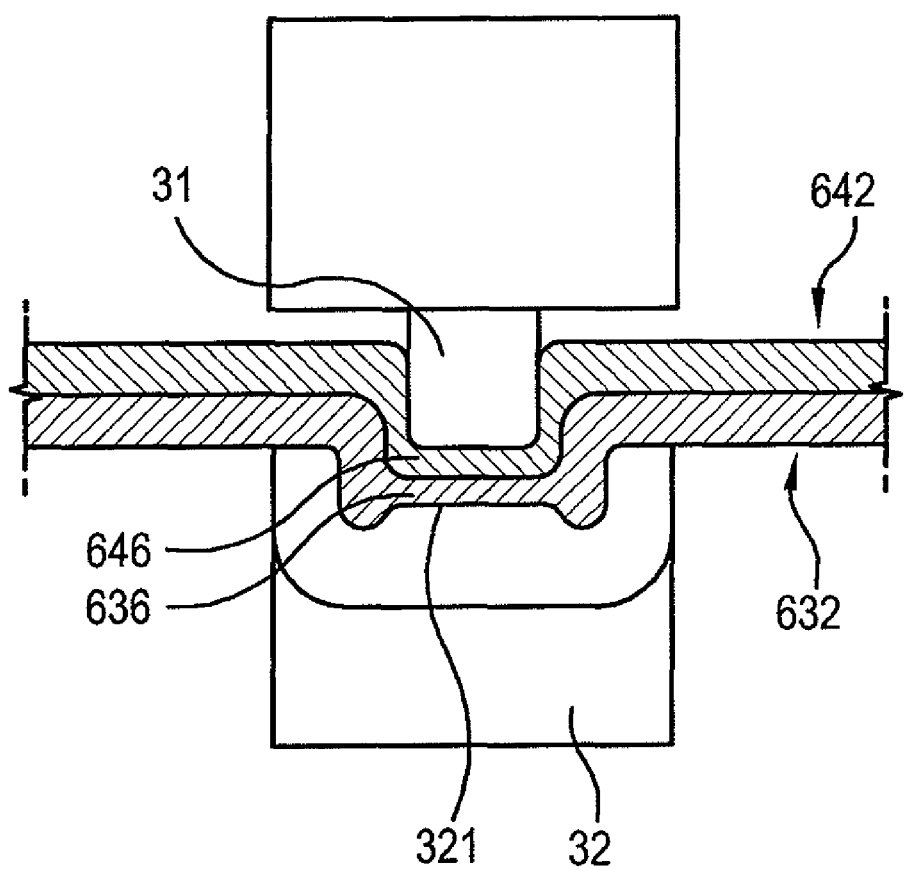
FIG. 12 is a sectional view showing a process of joining the cover member of FIG. 11.

That is, as shown in FIG. 12, the joining plate 636 is joined to the joining mount 646 by punching an overlapping plane of the joining plate 636 and the joining mount 646 in the direction crossing the plane of the joining plate and mount 636 and 646. More specifically, the joining plate 636 and the joining mount 646, which overlap with each other, are placed on a punching mount 32 having a groove 321, and the joining plate 636 is joined to the joining mount 646 by punching the joining plate 636 and the joining mount 646 with a punch 31.

Accordingly, the first side joining part 632 and the second side joining part 642 are simply and stably joined to each other.

With this structure, the first joining part 63 (shown in FIG. 8) is simply and stably joined to the second joining part 64 (shown in FIG. 8). In addition, the joint between the first joining part 63 and the second joining part 64 can be maintained even under pressure in various directions.

The method of joining the first joining part 63 and the second joining part 64 to each other is provided as an example and is not particularly limited. For example, the method of joining the first side joining part 632 and the second side joining part 642 to each other may be substituted with the method of joining the first front joining part 631 and the second front joining part 641 to each other.

In addition, the first joining part 63 may be joined to the second joining part 64 by welding an overlapping plane of the joining plate 636 of the first joining part 63 and the joining mount 646 of the second joining part 64 in the direction crossing the plane of the joining plate and mount 636 and 646. The welding may be carried out using any of a spot welding method and a laser welding method.

An exemplary embodiment of the present invention will be described with reference to FIGS. 13 and 14.

Figure 13:
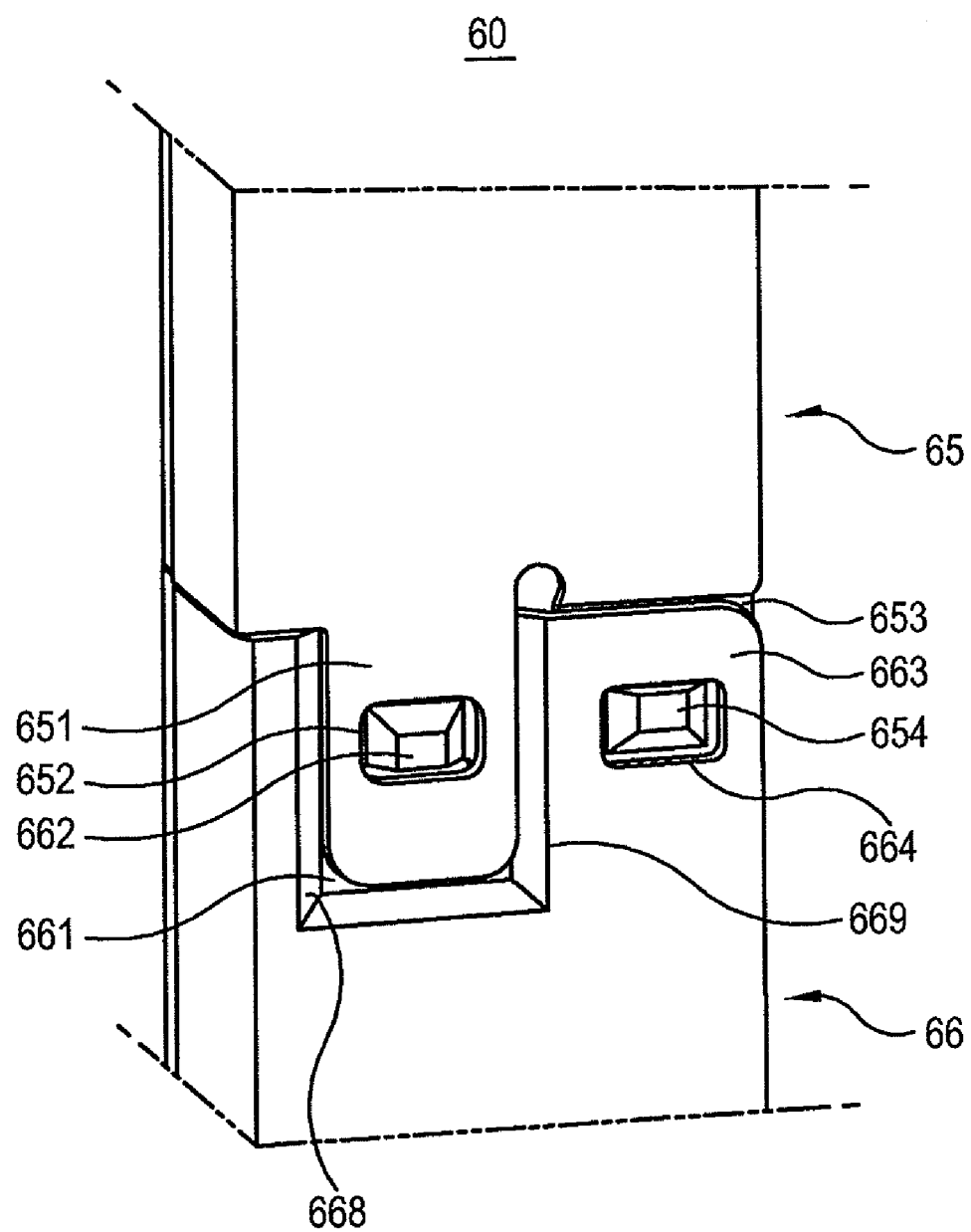
FIG. 13 is a partial perspective view of a cover member used for a display device according to an exemplary embodiment of the present invention.
Figure 14:
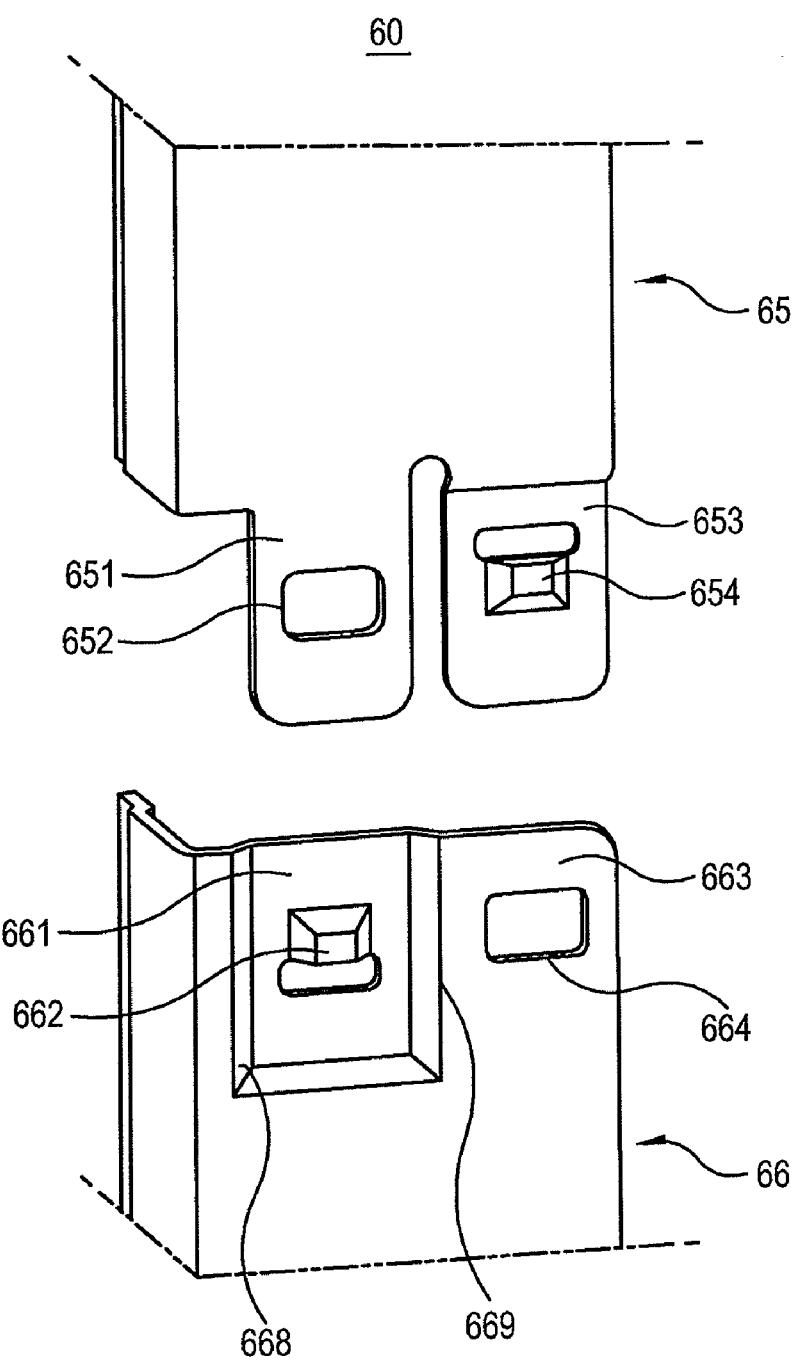
FIG. 14 is an exploded perspective view showing a joining region of the cover member of FIG. 13.

As shown in FIGS. 13 and 14, a first joining part 65 includes joining plates 651 and 653 and a second joining part 66 includes joining mounts 661 and 663. The joining plates 651 and 653 overlap with the joining mounts 661 and 663 in a direction crossing a plane of the joining plates 651 and 653. In addition, locking projections 654 and 662 are formed in the joining plates 651 or 653 and the joining mounts 661 or 663, and locking holes 652 and 664 are formed in the other of the joining plates 651 or 653 and the joining mounts 661 or 663. The locking projections 654 and 662 have a polygonal hook shape, for example, a trapezoidal hook shape.

The joining plates 651 and 653 and the joining mounts 661 and 663 are respectively formed in pairs. That is, the joining plates 651 and 662 include a first joining plate 651 and a second joining plate 653, and the joining mounts 661 and 663 include a first joining mount 661 and a second joining mount 663. Here, the first joining plate 651 contacts an outer surface of the first joining mount 661, and the second joining plate 653 contacts an inner surface of the second joining mount 663. In addition, guide grooves 668 and 669 that guide the first joining plate 651 and the second joining plate 653, respectively, are formed in the outer surface of the first joining mount 661 and the inner surface of the second joining mount 663, respectively.

The first joining part 65 and the second joining part 66 are formed in one or both of the front portion 601 (shown in FIG. 1) and the side portion 602 (shown in FIG. 1) of the cover member 60.

With this configuration, the first joining part 65 is simply and stably joined to the second joining part 66. In addition, the joining between the first joining part 65 and the second joining part 66 can be maintained even under pressure in various directions.

An exemplary embodiment of the present invention will be described with reference to FIGS. 15 and 16.

Figure 15:
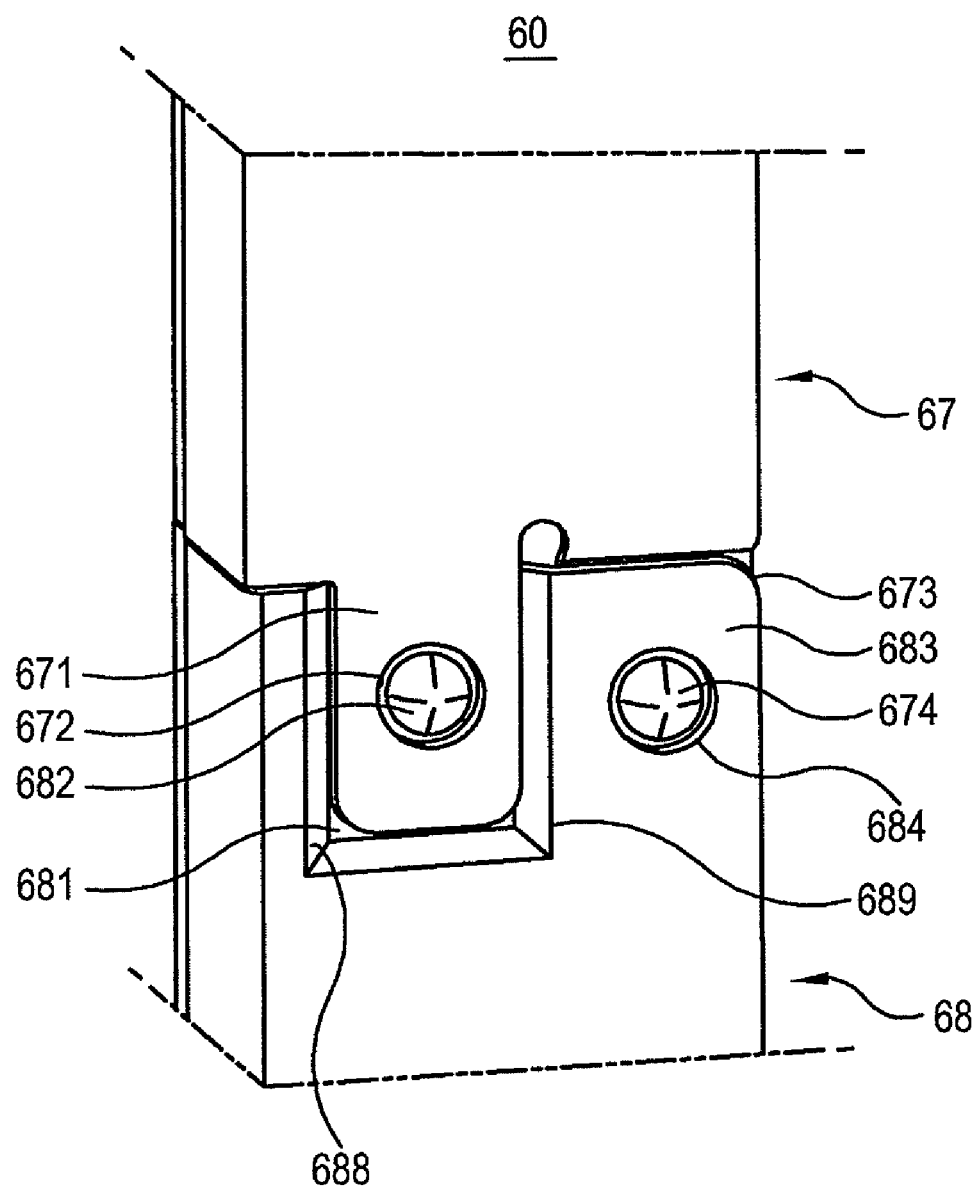
FIG. 15 is a partial perspective view of a cover member used for a display device according to an exemplary embodiment of the present invention.
Figure 16:
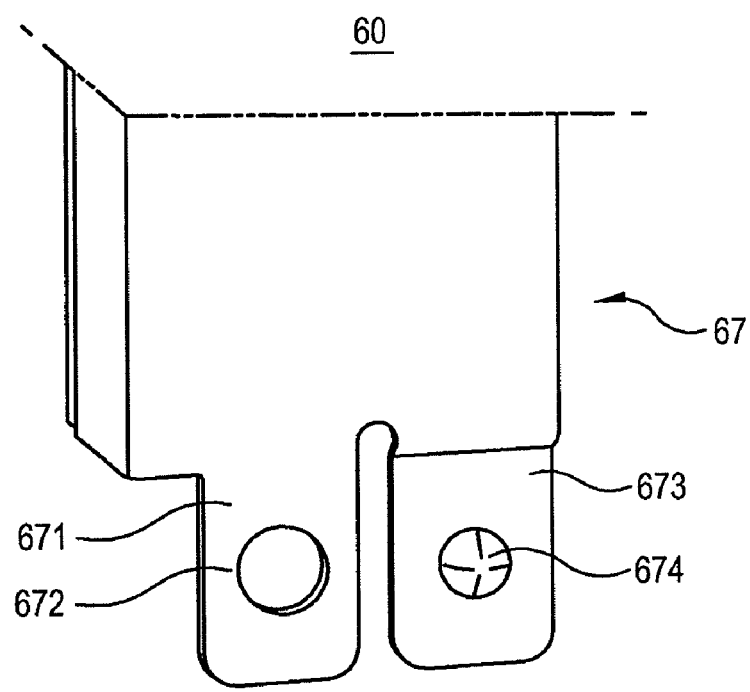
FIG. 16 is an exploded perspective view showing a joining region of the cover member of FIG. 15.
Figure 16:
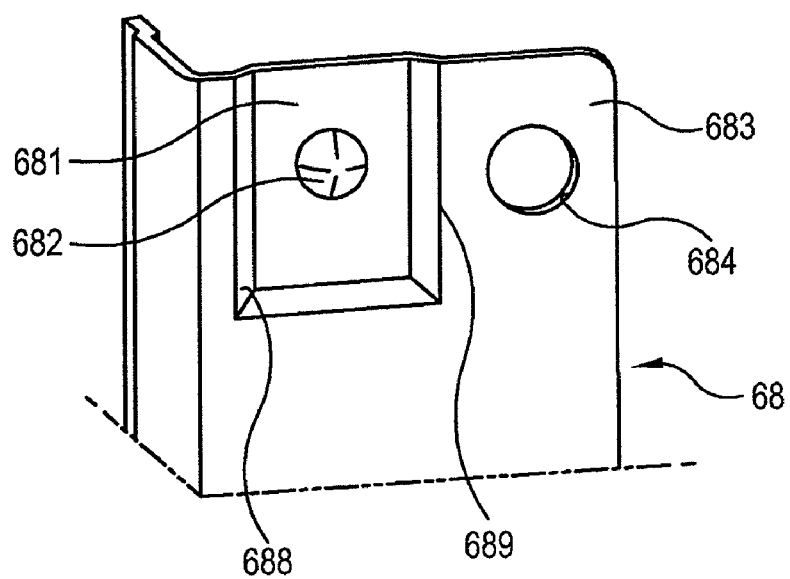

As shown in FIGS. 15 and 16, a first joining part 67 includes joining plates 671 and 673 and a second joining part 68 includes joining mounts 681 and 683. The joining plates 671 and 673 overlap with the joining mounts 681 and 683 in a direction crossing a plane of the joining plates 671 and 673. In addition, locking projections 674 and 682 are formed in the joining plates 671 or 683 and the joining mounts 671 or 673, and locking holes 672 and 684 are formed in the other of the joining plates 671 or 673 and the joining mounts 681 or 683. The locking projections 674 and 673 have a hemisphere shape.

The joining plates 671 and 673 and the joining mounts 681 and 683 are respectively formed in pairs. That is, the joining plates 671 and 673 include a first joining plate 671 and a second joining plate 673, and the joining mounts 681 and 683 include a first joining mount 681 and a second joining mount 683. The first joining plate 671 contacts an outer surface of the first joining mount 681, and the second joining plate 673 contacts an inner surface of the second joining mount 683. In addition, guide grooves 688 and 689 that guide the first joining plate 671 and the second joining plate 673, respectively, are formed in the outer surface of the first joining mount 681 and the inner surface of the second joining mount 683, respectively.

The first joining part 67 and the second joining part 68 are formed in one or both of the front portion 601 (shown in FIG. 1) and the side portion 602 (shown in FIG. 1) of the cover member 60.

With this configuration, the first joining part 67 is simply and stably joined to the second joining part 68. In addition, the joining between the first joining part 67 and the second joining part 68 can be maintained even under pressure in various directions.

An exemplary embodiment of the present invention will be described with reference to FIG. 17.

Figure 17:
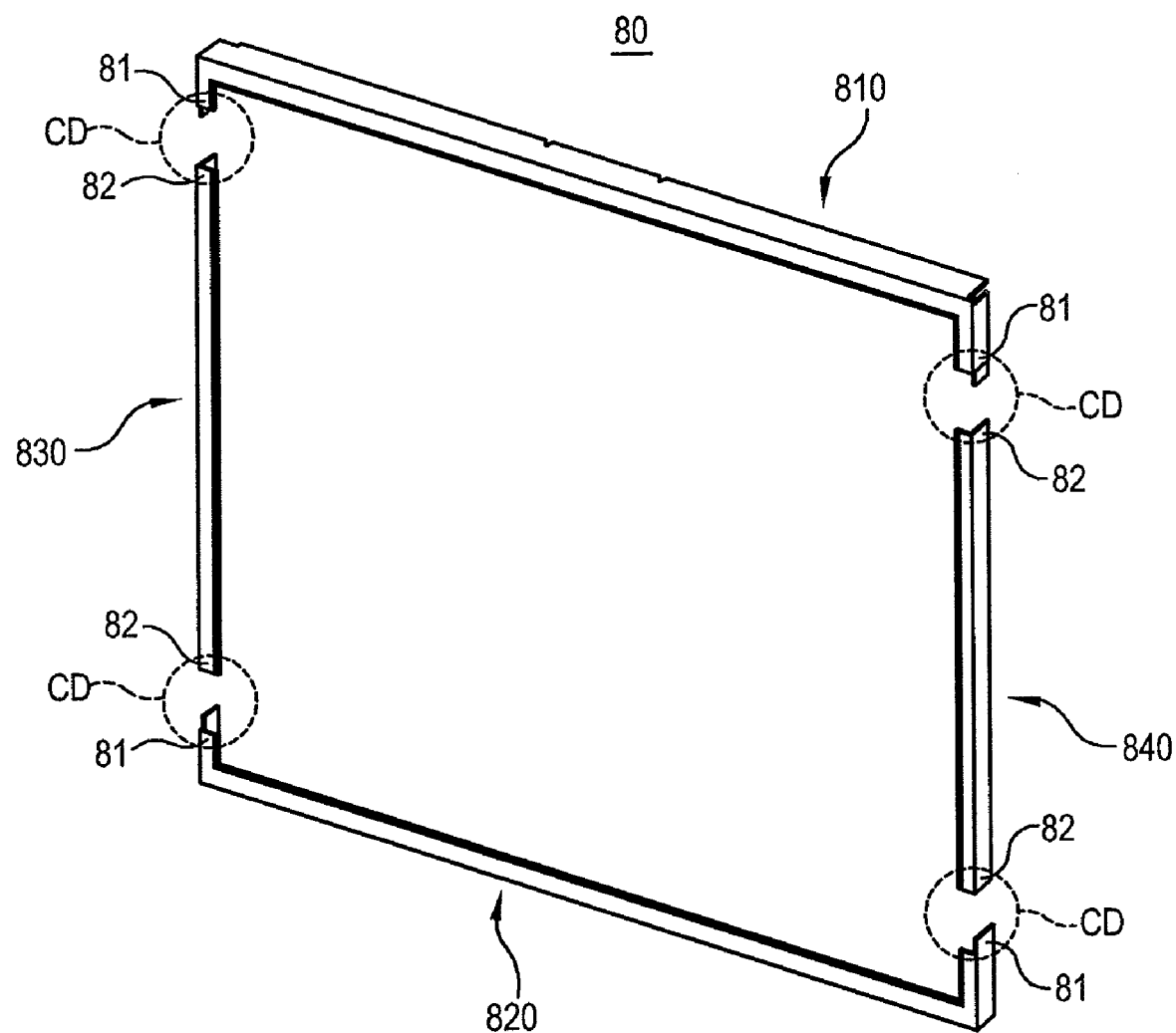
FIG. 17 is an exploded perspective view of a cover member used for a display device according to an exemplary embodiment of the present invention.

As shown in FIG. 17, a cover member 80 includes four bar-like members 810, 820, 830 and 840 which are joined to each other in a hollow rectangular shape. That is, the cover member 80 has four joining regions CD. In the joining regions CD, end portions of the members 810, 820, 830 and 840 are respectively joined to each other through first joining parts 81 and second joining parts 82.

Figure 18:
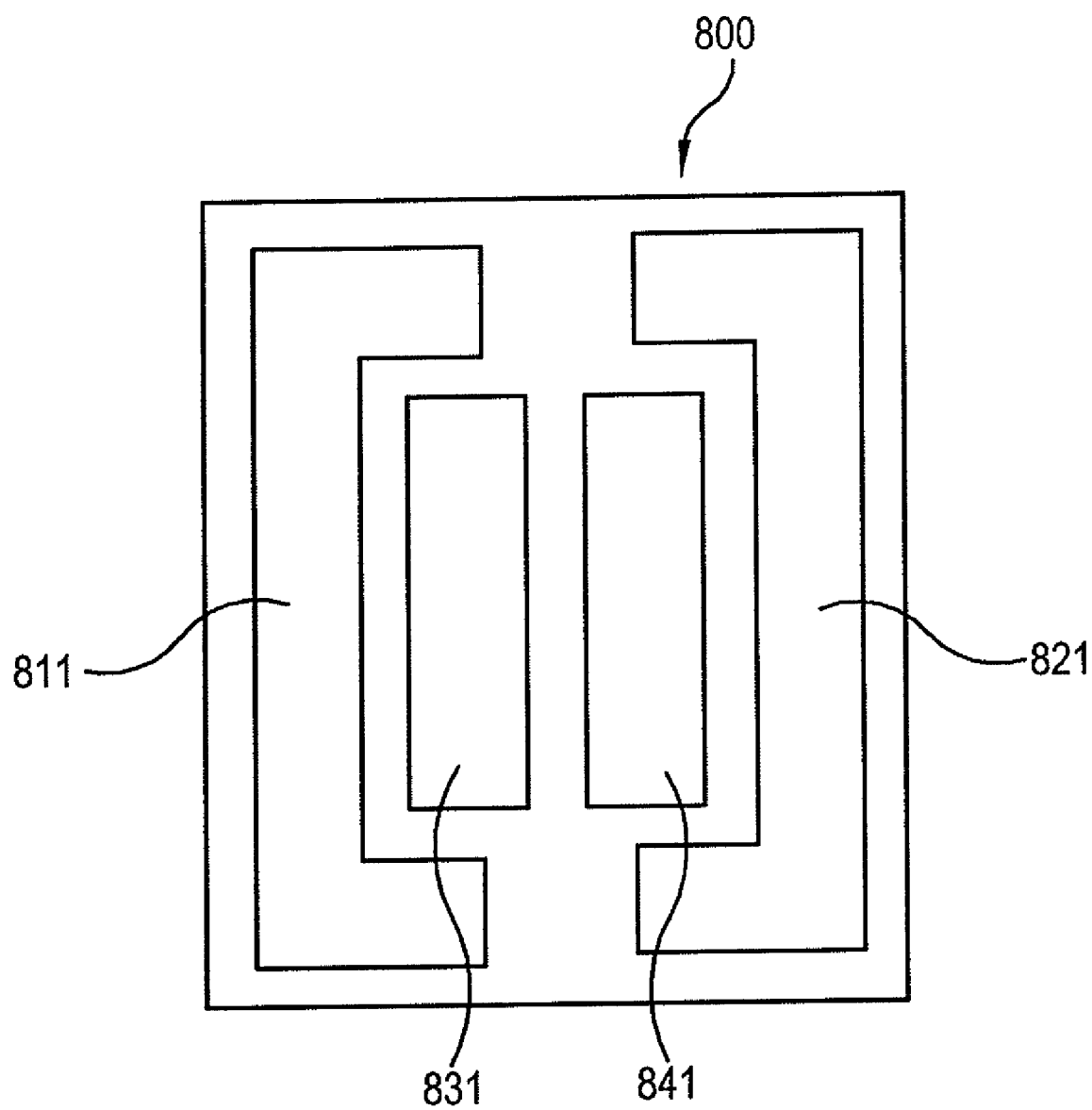
FIG. 18 is a plan view showing a metal plate used to fabricate the cover member of FIG. 17.

FIG. 18 shows a metal plate 800 to be cut to form the four bar-like members 810, 820, 830 and 840 (shown in FIG. 17). The metal plate 800 is cut to form four parent bar-like members 811, 821, 831 and 841 which are then machined to form the bar-like members 810, 820, 830 and 840.

As the cover member 80 (shown in FIG. 17) is fabricated in this manner, waste of the metal plate 800 used to fabricate the cover member 80 can be minimized.

Figure 19:
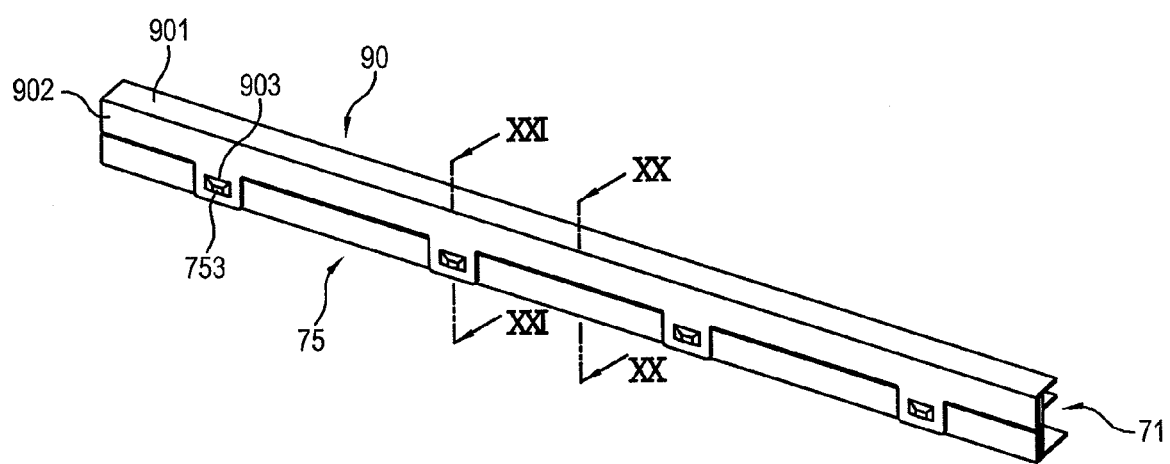
FIG. 19 is a partial sectional view showing a cover member according to a an exemplary embodiment of the present invention, wherein the cover member is joined to an accommodating member.
Figure 20:
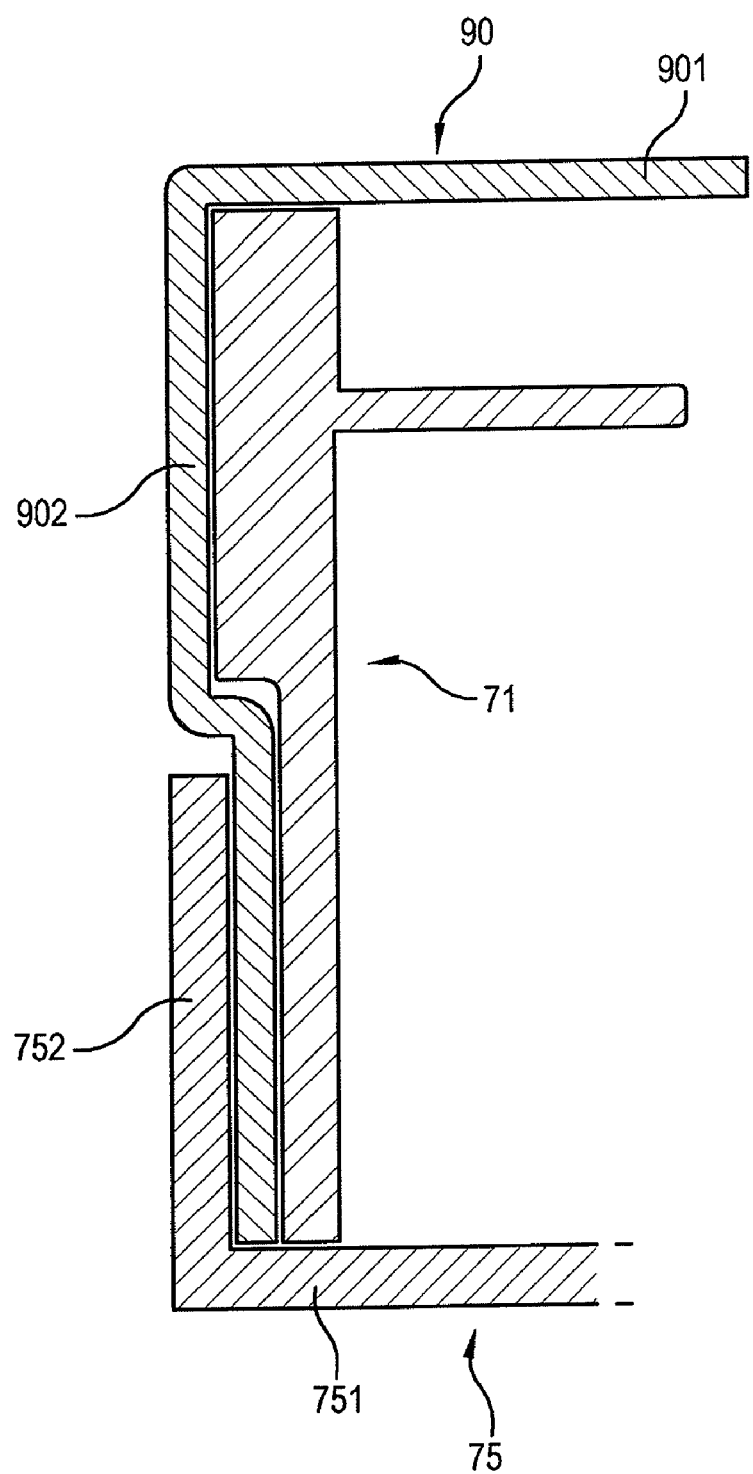
FIG. 20 is a sectional view taken along line XX-XX of FIG. 19.
Figure 21:
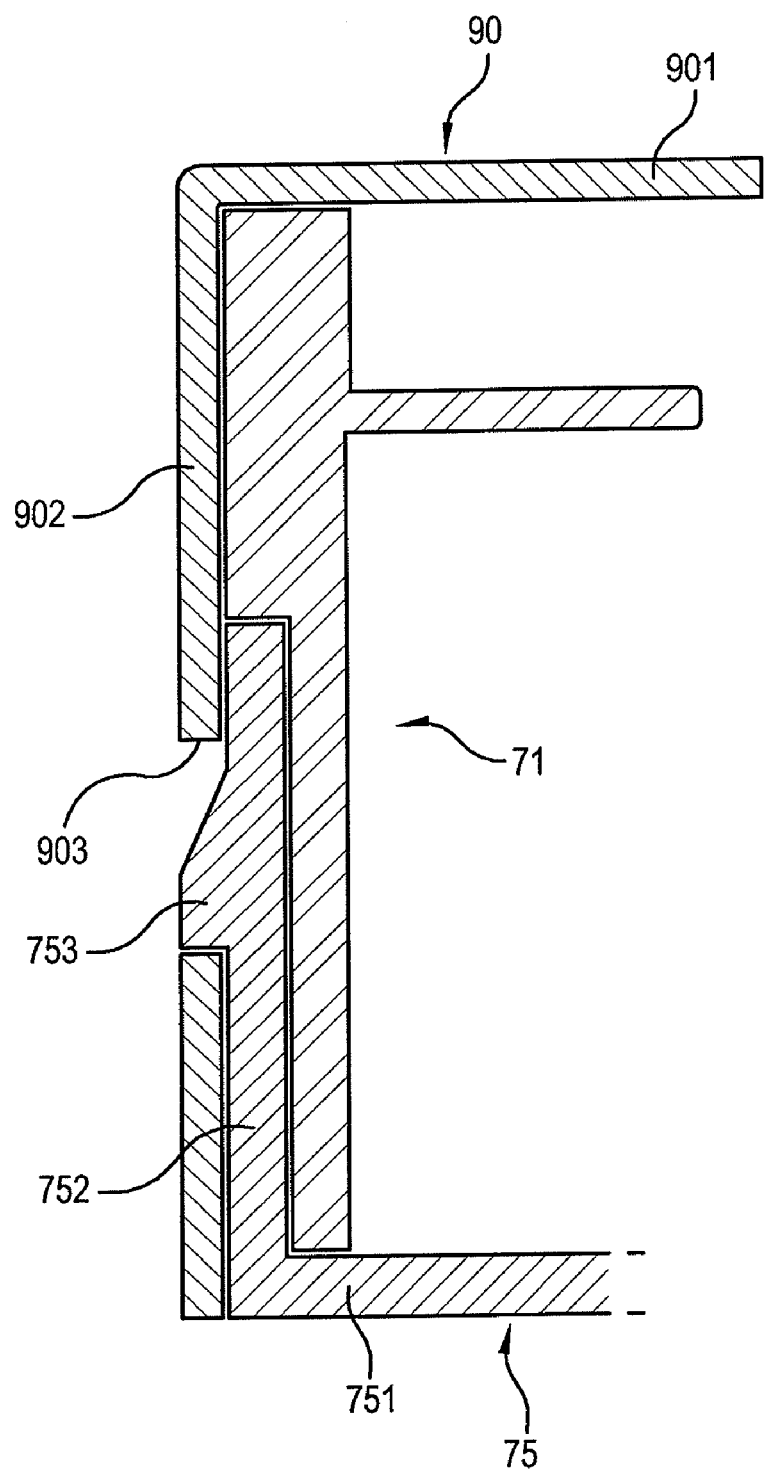
FIG. 21 is a sectional view taken along line XXI-XXI of FIG. 19.

An exemplary embodiment of the present invention will be described with reference to FIGS. 19 to 21. FIGS. 19 to 21 show a portion of a cover member 90 and an accommodating member 75, that is, a portion of a case for the display device 100.

The accommodating member 75 includes a bottom portion 751 and a side wall portion 752 that is bent and extends from the bottom portion 751 and is joined to a side portion 902 of the cover member 90. In addition, a locking projection 753 is formed in the side portion 902 of the cover member 90 or the side wall portion 752 of the accommodating member 75, and a locking hole 903 is formed in the other of the side portion 902 of the cover member 90 or the side wall portion 752 of the accommodating member 75.

As shown in FIGS. 19 and 21, in one embodiment, the locking projection 753 is formed in the accommodating member 75 and the locking hole 903 is formed in the cover member 90.

In addition, as shown in FIG. 20, a portion of the side portion 902 of the cover member 90 contacts an inner surface of the side wall portion of the accommodating member 75.

In addition, as shown in FIG. 21, another portion of the side portion 902 of the cover member 90 contacts an outer surface of the side wall portion 752 of the accommodating member 75. The locking projection 753 and the locking hole 903 are formed in a portion where the side portion 902 of the cover member 90 contacts the outer surface of the side wall portion 752 of the accommodating member 75.

With this configuration, the cover member 90 is simply and tightly joined to the accommodating member 75. In addition, the tight joining between the cover member 90 and the accommodating member 75 can be maintained even under pressure in various directions.

Accordingly, the productivity and structural stability of the case 90 and 75 for use in the display device 100 can be improved.

The embodiments of the present invention provide a display device with improved productivity which is capable of reducing waste of materials during fabrication of the display device.

In addition, the cover member used for the display device can be simply and stably formed.

In addition, the cover member can be securely maintained so as not to be impaired even under pressure in various directions.

In addition, the cover member and the accommodating member can be simply joined to each other, and the joining between the cover member and the accommodating member can be securely maintained even under pressure in various directions.

Accordingly, the productivity and structural stability of the case for use in the display device can be improved.

Although illustrative embodiments of the present invention have been shown and described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display device comprising:
a panel assembly displaying an image; and
a cover member surrounding the panel assembly and having a display window exposing a front side of the panel assembly, the cover member having a first joining part and a second joining part, which are overlapped with and joined to each other, wherein at least one of the first and second joining parts has a stepped portion, wherein the first and second joining parts are respectively extended from opposite ends of a continuous element.

2. The display device according to claim 1, wherein the cover member has a front portion facing an upper surface of the panel assembly, and a side portion extending from the upper portion to face a side surface of the panel assembly, and
wherein each of the first and second joining parts has a front joining portion forming a portion of the front portion of the cover member, and a side joining portion forming a portion of the side portion of the cover member.

3. The display device according to claim 1, wherein a boundary between the first and second joining parts forms a zigzag pattern on an outer surface of the cover member.

4. The display device according to claim 2, wherein the first joining part comprises a joining plate overlapping with the second joining part, and the joining plate has combination hole, and the second joining part has a combination protrusion inserted into the combination hole.

5. The display device according to claim 4, wherein the combination protrusion of the second joining part protrudes toward the panel assembly.

6. The display device according to claim 2, wherein the first joining part further comprises a first locking hole formed therethrough, and the second joining part further comprises a first locking projection, which is inserted into the first locking hole.

7. The display device according to claim 6, wherein the first joining part comprises a first joining plate having the first locking projection and a second joining plate having a second locking hole, and the second joining part further comprises a second locking projection passing through and projecting from the second locking hole, and wherein the first joining plate contacts an outer surface of the first joining part, and the second joining plate contacts an inner surface of the second joining part to face the panel assembly.

8. The display device according to claim 7, wherein the second joining part has guide grooves, which guide the first joining plate and the second joining plate.

9. The display device according to claim 7, wherein the locking projection has a hemisphere shape.

10. The display device according to claim 7, wherein the locking projection has a hook shape.

11. The display device according to claim 6, wherein an end of the first locking projection passes through and projects from the first locking hole, and has a diameter greater than a diameter of the first locking hole to secure the first joining part to the second joining part.

12. The display device according to claim 2, wherein the first joining part further comprises an extending portion which extends toward the second joining part, and a locking portion which is formed at an end of the extending portion, and wherein the second joining part further comprises a locking groove receiving the extending portion and the locking portion.

13. The display device according to claim 12, wherein the locking portion of the first joining part is tightly joined to the locking groove of the second joining part.

14. The display device according to claim 1, further comprising an accommodating member combined with the cover member to receive the panel assembly and comprising a bottom portion and a side wall portion, the side wall portion is bent from the bottom portion and is joined to the cover member.

15. The display device according to claim 14, wherein the cover member contacts an inner surface of the side wall portion of the accommodating member.

16. The display device according to claim 1, further comprising a backlight assembly which is accommodated in the accommodating member and supplies a light to the panel assembly.

17. A method of manufacturing a display device, the method comprising:

forming a metallic member having a linear shape having a first and a second end opposite to the first end;

bending the metallic member to have a substantially rectangular shape having an opening;

overlapping the first end with the second end and combining the first end with the second end to form a cover member, wherein the first end comprises a first joining part and the second end comprises a second joining part; and providing the cover member to a panel assembly such that the cover member surrounds the panel assembly and that a front side of the panel assembly is exposed through the opening.

18. The method of claim 17, wherein each of the first and second ends has a stepped portion, and the stepped portion of the first end is aligned with the stepped portion of the second end.

19. The method of claim 17, wherein the first end comprises a joining plate overlapping with the second end, and the joining plate has combination hole, and the second end has a combination protrusion inserted into the combination hole.

20. The method of claim 17, wherein the first end comprises an extending portion which extends toward the second end, and a locking portion which is formed at an end of the extending portion, and wherein the second end comprises a locking groove receiving the extending portion and the locking portion.

21. The method of claim 17, wherein the first end comprises a first joining plate having a first locking projection and a second joining plate having a second locking hole, and the second end comprises a first joining plate having a first locking hole receiving the first locking projection, and a second locking projection passing through and projecting from the second locking hole, and wherein the first joining plate contacts an outer surface of the first end, and the second joining plate contacts an inner surface of the second end.

* * * * *